United States Patent [19]

Oosterling et al.

[11] 4,055,037

[45] Oct. 25, 1977

[54] MOWING DEVICE

[75] Inventors: Pieter Adriaan Oosterling; Hendricus Cornelis van Staveren, both of Nieuw-Vennep, Netherlands

[73] Assignee: Multinorm, B. V., Nieuw-Vennep, Netherlands

[21] Appl. No.: 644,861

[22] Filed: Dec. 29, 1975

[30] Foreign Application Priority Data

Jan. 13, 1975 Netherlands .................. 7500383

[51] Int. Cl.² .............................................. A01D 84/00
[52] U.S. Cl. ................................... 56/16.4; 56/DIG. 1
[58] Field of Search .................. 56/13.6, 1, DIG. 1, 56/157, 16.4, 16.5

[56] References Cited
U.S. PATENT DOCUMENTS

| | | | |
|---|---|---|---|
| 3,395,522 | 8/1968 | Zweegers | 56/295 |
| 3,699,755 | 10/1972 | Hauser | 56/16.4 |
| 3,716,972 | 2/1973 | Case et al. | 56/1 |
| 3,977,165 | 8/1976 | Klinner et al. | 56/16.4 |

Primary Examiner—Russell R. Kinsey
Attorney, Agent, or Firm—Snyder, Brown & Ramik

[57] ABSTRACT

In a mowing device comprising a frame, cutting members supported by the frame and being movable in a horizontal plane and at least one rotor journalled in said frame so as to be rotatable about a rotary axis for transporting cut crop, said rotor comprising at least one support and at least one catch connected with the support so as to be pivotable about a pivotal axis and adapted to engage the crop, for maintaining the catch in its predetermined position the catch abuts against a stop, viewed in the direction of rotation of the rotor, whilst the center of gravity of the catch is located behind the radial plane going through the pivotal axis.

9 Claims, 2 Drawing Figures

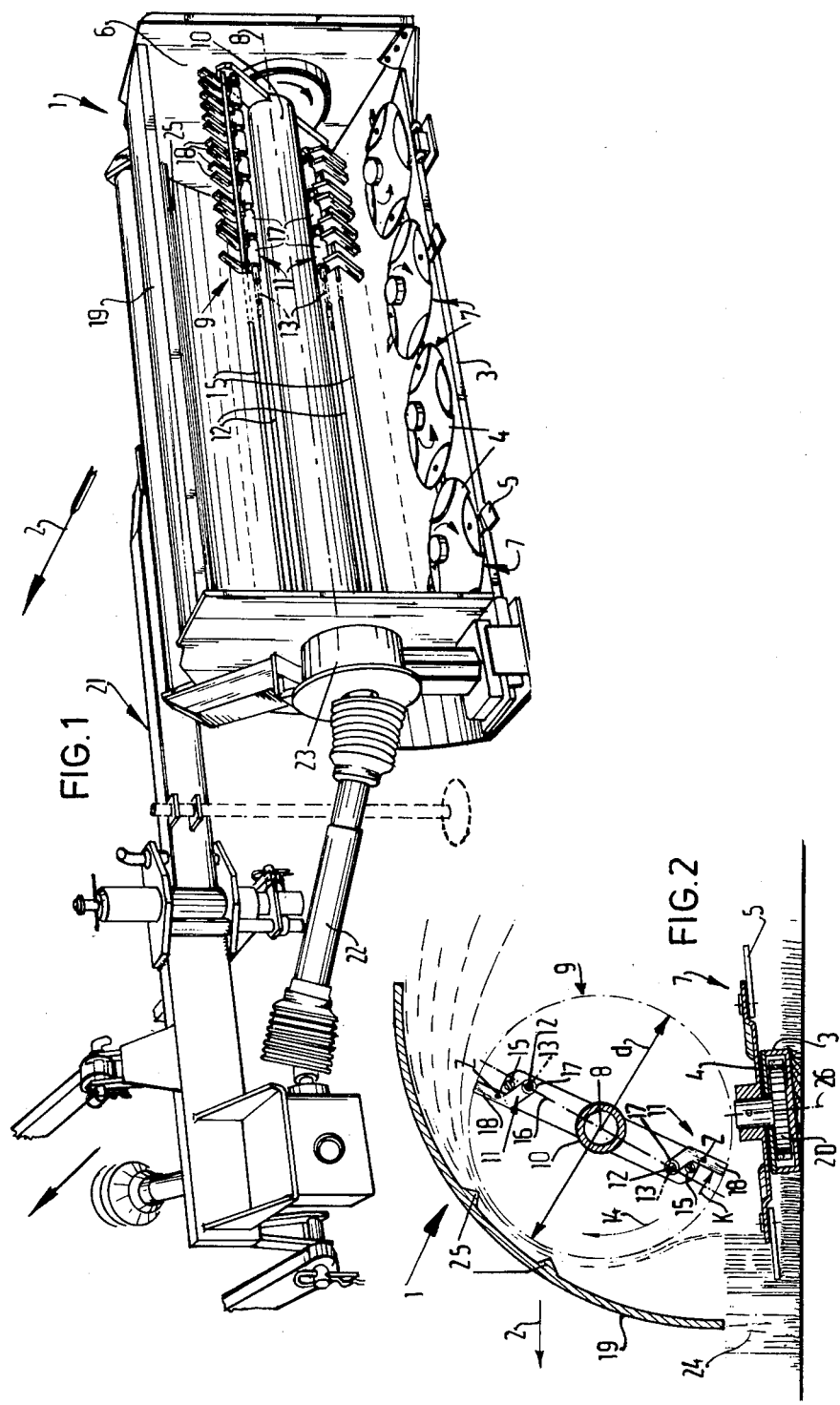

MOWING DEVICE

The invention relates to a mowing device comprising a frame, cutting members supported by the frame and being movable in a horizontal plane and at least one rotor journalled in said frame so as to be rotatable about a rotary axis for transporting cut crop, said rotor comprising at least one support and at least one catch connected with the support so as to be pivotable about a pivotal axis and adapted to engage the crop.

Such a mowing device is known.

When the catch engages the crop, its centre of gravity is displaced with respect to the support opposite the direction of rotation of the rotor out of the radial plane going through the pivotal axis by the resistance offered by the crop to the catch. Thus the diameter of the rotor is reduced, which reduces the conveying effect and the crushing effect of the rotor on the crop.

The invention has for its object to provide an improvement maintaining the catch in its predetermined position. According to the invention the catch of the mower abuts against a stop, viewed in the direction of rotation of the rotor, whilst the centre of gravity of the catch is located behind the radial plane going through the pivotal axis.

The invention will be described more fully in the following description with reference to the drawing of a preferred embodiment of the mower in accordance with the invention.

In the drawing:

FIG. 1 is a perspective rear view and

FIG. 2 is a sectional view taken on the line II—II of FIG. 1.

The mowing device 1 according to the invention comprises a frame 6, an elongated housing 3 of a gear wheel drive 20, extending transversely of the direction of movement 2 of the mowing device 1, the ends of said housing 3 being secured to the frame 6, four rotatable mowing members 7, journalled on and arranged above the housing 3 and adapted to rotate about upright axes 26, each cutting member comprising a cutter holder 4 and cutters 5 secured thereto, and a rotor 9 adapted to rotate about a horizontal axis 8 and journalled in the frame 6 for transporting cut crop 24.

The rotor 9 comprises a support 10 and two sets of catches 11 engaging the cut crop. For each set of catches 11 the support 10 has a longitudinal axis 12, on which the catches 11 are connected with the support 10 so as to be pivotable about a horizontal pivotal axis 13. The catches 11 abut each — viewed in the direction of rotation 14 of the rotor 9 — against a bar 15, which forms a stop, whilst the centre of gravity Z of each catch 11 is located behind the radial plane 16 going through the pivotal axis 13. Each catch 11 comprises a sleeve 17 with two separate tines 18, which are capable of penetrating between the stems of the crop.

The rotor 9 is surrounded by a hood 19, fastened to the frame 6.

The centrifugal force urges the catches 11 with prestress against a bar 15, which counteracts the reactive force K exerted by the crop 24 on the catches 11 so that the position of the catches 11 and the diameter $d$ of the rotor 9 are better maintained.

The mower 1 may be attached to an agricultural tractor by means of a suspension frame 21. Through a universal shaft 22 and a bevel gear wheel transmission 23 the rotor 9 and the gear wheel drive 20 are driven.

The crop 24 is cut by the cutters 7, engaged by the catches 11 of the rotor 9, transported along the hood 19, crushed at strips 25 secured to the hood 19 and deposited on the field behind the mower 1, where it can dry rapidly owing to the crushing effect. Not until is attained a given degree of overload, which depends upon the weight of the catch 11 and the place of the centre of gravity Z with respect to the longitudinal axis 12 of the catch 11, as well as upon the number of revolutions of the rotor 9, the position of the catch 11 changes with respect to the rotor 9. By an appropriate choice of these magnitudes the situation in which the position of the catches 11 changes is predetermined.

What we claim is:

1. A mowing device comprising in combination:
a frame adapted to be moved over the ground;
cutter means carried by said frame for cutting a crop swath; and
crop transporting means disposed above said cutter means for engaging and transporting cut crop rearwardly with respect to the direction in which said frame is moved over the ground, said crop transport means comprising a rotor journalled about a substantially horizontal axis transverse to said direction of frame movement;
a plurality of crop-engaging members;
pivot means pivotally connecting said crop-engaging members individually to said rotor so that said crop-engaging members are rotated by said rotor in generally vertical side-by-side planes extending in said direction of movement and are rotated about said pivot means by centrifugal force toward positions in which the centers of gravity of said crop-engaging members lie in a radial plane containing said substantially horizontal axis and the axis of said pivot means; and
stop means, carried by said rotor and disposed in the path of rotation of said crop-engaging members about said pivot means, for individually preventing the crop-engaging members from reaching said positions, whereby said centers of gravity lie behind said radial plane and the paths swept by those portions of the crop-engaging members most remote from said pivot means are in predetermined spaced relation to said cutter means.

2. A mowing device as defined in claim 1 wherein said crop transporting means includes a pair of supports respectively connected to the opposite ends of said rotor and projecting radially from said rotor, said pivot means extending between said supports and said stop means extending between said supports.

3. A mowing device as defined in claim 1 including an arcuate hood fixed to said frame and disposed above and behind said crop transporting means; crusher means extending parallel to said horizontal axis and fixed to said hood in facing relation to said crop transporting means and disposed at a particular radial distance from said substantially horizontal axis of the rotor; said stop means controlling said crop-engaging member to sweep a path whose perimeter is closely spaced radially inwardly from said crusher means.

4. A mowing device as defined in claim 3 wherein said cutter means comprises a plurality of rotary cutting members disposed above said frame and rotatable about substantially vertical axes to sweep overlapping paths.

5. A mowing device as defined in claim 1 wherein said cutter means comprises a plurality of rotary cutting members disposed above said frame and rotatable about substantially vertical axes to sweep overlapping paths.

6. A mowing device as defined in claim 5 including a horizontal rib on said hood extending into close proximity to the paths swept by the outer ends of said tines whereby to effect a crushing action on crop swept therepast.

7. A mowing device as defined in claim 6 wherein each of said tines is of generally L-shape and said first and second rods are positioned such that the outer portion of each tine extends substantially radially.

8. A mowing device as defined in claim 7 including a plurality of sleeves disposed in end-to-end relation and pivotally received on said first rod, and a pair of said tines being fixed to each sleeve.

9. A mowing device comprising, in combination:
   a frame adapted to be moved over the ground;
   cutter means carried by said frame for cutting a crop swath; and
   crop transport means disposed above said cutter means for engaging and transporting cut crop rearwardly with respect to the direction in which said frame is moved over the ground;
   said crop transport means comprising an arcuate hood disposed above said cutter means, a rotor journalled about a substantially horizontal axis transverse to said direction of movement, a pair of supports fixed respectively to the opposite ends of said rotor and projecting radially therefrom, a first rod fixed to and extending between said supports, a second rod fixed to and extending between said supports, and a plurality of tines pivotally carried by said first rod;
   said second rod being spaced radially outwardly from said first rod and each tine extending radially beyond said second rod and bearing thereagainst in response to rotation of said rotor whereby said second rod presents a stop for all of said tines, each tine having an outer end which sweep a circular path passing above said cutter means and into closely spaced relation with said hood.

* * * * *